United States Patent [19]

Huiszoon

[11] Patent Number: 6,044,326
[45] Date of Patent: Mar. 28, 2000

[54] MEASURING BOREHOLE SIZE

[75] Inventor: Cornelis Huiszoon, Houston, Tex.

[73] Assignee: Dresser Industries, Inc., Dallas, Tex.

[21] Appl. No.: 09/232,504

[22] Filed: Jan. 15, 1999

[51] Int. Cl.⁷ .................................................. G06F 19/00
[52] U.S. Cl. .................................................. 702/8; 702/6
[58] Field of Search .................................. 367/86, 87, 83; 702/6, 7, 9, 8; 250/254

[56] References Cited

U.S. PATENT DOCUMENTS

| | | | |
|---|---|---|---|
| 5,017,778 | 5/1991 | Wraight | 250/254 |
| 5,091,644 | 2/1992 | Minette | 250/254 |
| 5,120,963 | 6/1992 | Robinson et al. | 250/363.01 |
| 5,397,893 | 3/1995 | Minette | 250/254 |
| 5,451,779 | 9/1995 | Spross et al. | 250/266 |
| 5,486,695 | 1/1996 | Schultz et al. | 250/261 |
| 5,774,420 | 6/1998 | Heysse et al. | 367/83 |
| 5,842,149 | 11/1998 | Harrell et al. | 702/9 |

OTHER PUBLICATIONS

Best, D. et al., "An Innovative Approach To Correct Density Measurements While Drilling For Hole Size Effect", SPWLA 31st Annual Logging Symposium, Jun. 24–27, 1990, pp. 1–21.

Birchak, J.R. et al, "Standoff and Caliper Measurements While Drilling Using A New Formation–Evaluation Tool With Three Ultrasonic Transducers", 68th Annual Technical Conference and Exhibition of the Society of Petroleum Engineers, Houston, Texas, Oct. 3–6, 1993, pp. 793–806.

Holenka, J. et al, "Azimuthal Porosity While Drilling", SPWLA 36th Annual Logging Symposium, Jun. 26–29, 1995, pp. 1–12.

Paske, W.C. et al, "Measurement of Hole Size While Drilling", SPWLA 31st Annual Logging Symposium, Jun. 24–27, 1990, pp. 1–24.

Spross, R.L. et al., "Accurate MWD Density Measurements With Very Large Standoffs", SPWLA 36th Annual Logging Symposium, Jun. 26–29, 1995, pp. 1–12.

*Primary Examiner*—Christine K. Oda
*Assistant Examiner*—Victor J. Taylor
*Attorney, Agent, or Firm*—Howard L. Speight

[57] ABSTRACT

An apparatus and method for measuring the size of a borehole while drilling are disclosed. The apparatus includes a gamma ray source configured to direct gamma rays into a formation, a far gamma ray detector and a near gamma ray detector configured to detect gamma rays originating in the formation and a far gamma ray counter and a near gamma ray counter coupled to the far gamma ray detector and the near gamma ray detector, respectively. The apparatus also includes a sampler coupled to the gamma ray counters configured to take and store samples from the counters, the sampler configured to reset the counter when a sample is taken. The apparatus includes a density computer for computing far density and near density for each sample, a standoff computer for computing the standoff for each sample from the far density for that sample, a formation density and a mud density, and a borehole size computer for adding the maximum standoff, the minimum standoff and the diameter of the apparatus. An algorithm which "bins" the samples before computing standoff is also claimed.

23 Claims, 8 Drawing Sheets

Count rate

Fig. 3

Count rate

High count rate bin

Low count rate bin

Fig. 4

Count rate

Low count rate bin   High count rate bin

MEASURING BOREHOLE SIZE

FIELD OF THE INVENTION

This invention relates generally to measuring characteristics of geological formations penetrated by a borehole. In particular, this invention relates to measuring the diameter of the borehole. Even more particularly, this invention relates to measuring the diameter of the borehole while it is being drilled using data collected from a density-measuring tool.

BACKGROUND OF THE INVENTION

Geologists and geophysicists are interested in the characteristics of the formations encountered by a drill bit as it is drilling a well for the production of hydrocarbons from the earth. Such information is useful in determining the correctness of the geophysical data used to choose the drilling location and in choosing subsequent drilling locations. In horizontal drilling, such information can be useful in determining the location of the drill bit and the direction that drilling should follow.

Such information can be derived in a number of ways. For example, cuttings from the mud returned from the drill bit location can be analyzed or a core can be bored along the entire length of the borehole. Alternatively, the drill bit can be withdrawn from the borehole and a "wireline logging tool" can be lowered into the borehole to take measurements. In still another approach, "measurement while drilling" ("MWD") or "logging while drilling" ("LWD") tools make measurements in the borehole while the drill bit is working. There are a wide variety of logging tools, including resistivity tools, density tools, sonic or acoustic tools, and imaging tools.

Figure 1:
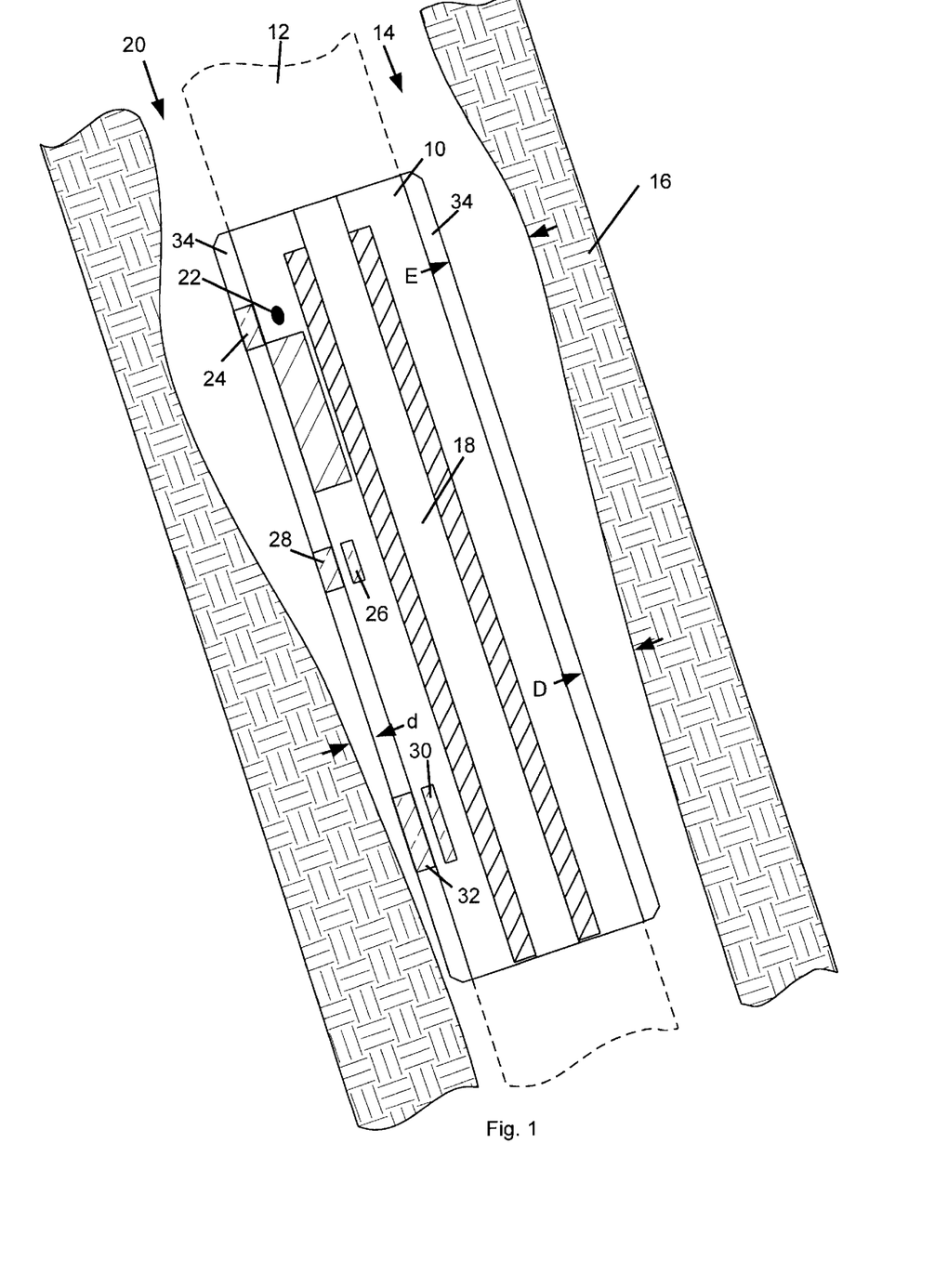
FIG. 1 is a section view of a density tool in a borehole.

A density tool 10 may be part of a drill string 12 that is used to drill a borehole 14 through a formation 16, as illustrated in FIG. 1. The drill string 12 is not horizontal but instead is, at least for the portion of the borehole shown in FIG. 1, drilled at an angle. Consequently, the drill string 12 and density tool 10 tend to be closer to one side of the borehole 14 than to the other, such that the distance d is smaller than the distance D. Further, the borehole 14 changes in diameter along its length due to cave-ins and the like, such that the distance E is larger than the distance D. Drilling mud is pumped down the drill string 12 through channel 18 to the bit (not shown) where it is circulated back to the surface through the annulus 20 between the drill string 12 and the formation 16.

The density tool includes a source 22 of gamma rays, preferably a cesium 137 source. Gamma rays from the source are emitted into the formation 16 through a low density window 24 as the drill string 12 rotates. A near detector 26 detects the gamma rays when they escape from the formation 16 and pass through a near detector low density window 28. The intensity of the escaping gamma rays is attenuated as they travel through the formation. For high energy gamma rays, the attenuation is caused by Compton scattering. For lower energy gamma rays, the attenuation is caused by photoelectric absorption. In the latter case, the attenuation is characterized by the photoelectric factor, or $P_e$.

A far detector 30 detects the attenuated gamma rays when they escape from the formation 16 and pass through a far detector low density window 32. The low density windows 24, 28 and 32 protrude through a stabilizer 34. The attenuation of the gamma rays is related to the electron density of the formation 16, which is, in turn, related to the common density of the formation 16. The near detector's response is influenced by borehole effects, which include effects related to the size of the borehole. The combined response of the near and far detector is used to provide an indication of the density of the formation.

It is useful to know the size of the borehole for a variety of reasons. For example, knowledge of the borehole size allows a computation of the volume of annulus which must be filled with cement when a casing is inserted into the borehole and secured with cement. The borehole size can also be a factor in the computation of some geological characteristics of the formation. Further, knowledge of borehole size can be a quality check on the results of other measurements that are affected by the borehole size.

In some wireline applications, borehole size is measured by a caliper, which is an arm that reaches out from the wireline tool and touches the side of the borehole. The caliper determines borehole size from the distance the arm has to reach to touch the side of the borehole. Borehole size can also be measured acoustically.

SUMMARY OF THE INVENTION

In general, in one aspect, the invention features an apparatus for measuring the size of a borehole while drilling. The apparatus includes a gamma ray source configured to direct gamma rays into a formation, a far gamma ray detector configured to detect gamma rays originating in the formation, a near gamma ray detector configured to detect gamma rays originating in the formation, a far gamma ray counter coupled to the far gamma ray detector, and a near gamma ray counter coupled to the near gamma ray detector. The apparatus also includes a sampler coupled to the gamma ray counters configured to take and store samples from the counters, the sampler configured to reset the counters when a sample is taken. The apparatus includes a density computer for computing near density and far density for each sample, a standoff computer for computing the standoff for each sample from a formation density, a mud density, and the far density for that sample, and a borehole size computer for adding the maximum standoff, the minimum standoff and the diameter of the apparatus.

Implementations of the invention may include one or more of the following. $\rho_b$ and $\rho_m$ may be computed by minimizing as a function of $\rho_b$ and $\rho_m$:

$$\sum_i^{\# of\ samples} \left( \rho_{near}\left(\rho_b, \rho_m, \frac{1}{C_f}\ln\left(\frac{\rho_b - \rho_m}{\rho_{f_i} - \rho_m}\right)\right) - \rho_{n_i} \right)^2$$

where $\rho_{n_i}$ = the near density of the $i^{th}$ sample $\rho_{f_i}$ = the far density of the $i^{th}$ sample.

$\rho_{near}$ and $\rho_{far}$ may be described with the following equations:

$$\rho_{near} = \rho_c \cdot e^{-C_n(\rho_b - \rho_m) \cdot so}$$

where $\rho_c = \rho_b$ if so<1 inch and $\rho_c = \rho_m + (\rho_b - \rho_m)e^{(1-so)}$ if so>1 inch and $C_n$ is a constant $$\rho_{far} = \rho_m + (\rho_b - \rho_m)e^{-C_f so}$$

where $C_f$ is a constant. Computing standoff for each sample may comprise using the following equation to compute standoff for each sample ($SO_i$), $$SO_i = \frac{1}{C_f} \ln\left(\frac{\rho_b - \rho_m}{\rho_{f_i} - \rho_m}\right)$$

where $C_f$ is a constant, $\rho_b$ is the formation density, $\rho_m$ is the density of the mud, $\rho_{f_i}$ is the far density computed for that sample.

$\rho_b$ may be computed and $\rho_m$ known. $\rho_b$ and $\rho_m$ may both be computed.

In general, in another aspect, the invention features a method for measuring borehole size while drilling. The method includes transmitting gamma rays from a tool coupled to a drill string into a formation surrounding the borehole as the drill string rotates, detecting gamma rays from the formation as the drill string rotates using a detector, and accumulating gamma ray detection counts over each of a plurality of segments of drill string rotation, wherein each segment of drill string rotation comprises less than one full rotation of the drill string and wherein the counts associated with each segment are associated with a sample associated with that segment. The method also includes selecting a set of maximum gamma ray detection counts, selecting a set of minimum gamma ray detection counts, computing standoff for both sets, and computing borehole size using the computed standoffs.

Implementations of the invention may include one or more of the following. The method may include determining whether borehole size can be computed from the gamma ray detection counts. Determining whether borehole size can be computed from the gamma ray detection counts may include determining whether sufficient difference exists between formation density and mud density. The method may include determining if separate sets should be constructed. Determining if separate sets should be constructed may include computing an expected standard deviation for a subset of the gamma ray detection counts, computing an actual standard deviation for the subset of gamma ray detection counts, and comparing the expected standard deviation to the actual standard deviation. Comparing may include dividing the actual standard deviation by the expected standard deviation and comparing the ratio to a predetermined number. Selecting a set of maximum gamma ray detection counts may comprise selecting the minimum number of samples with counts closest to the maximum count so that the ratio of a standard deviation of the counts of the selected samples to the expected standard deviation of the counts of the selected samples is greater than a predetermined number. The method may include computing the expected standard deviation of the selected counts by talking the square root of the average of the selected counts. Selecting a set of minimum gamma ray detection counts may comprise selecting the minimum number of samples with counts closest to the minimum count so that the ratio of a standard deviation of the counts of the selected samples to the expected standard deviation of the counts of the selected samples is greater than a predetermined number. Computing standoff for both sets using computed formation density may comprise using the following equation to compute standoff:

$$SO = \frac{1}{C_f} \ln\left(\frac{\rho_b - \rho_m}{\rho_f - \rho_m}\right)$$

where $C_f$ is a constant, $\rho_b$ is the formation density, $\rho_m$ is the density of the mud, and $\rho_f$ is the far density computed from the average count for all far gamma ray counts in the set. $\rho_b$ may be computed and $\rho_m$ may be known. The method may include selecting one of the sets as the set corresponding to minimum standoff. Selecting one of the sets as the set corresponding to minimum standoff may include selecting the set with the higher far density if mud weight is less than a predetermined amount. Selecting one of the sets as the set corresponding to minimum standoff may include measuring the photoelectric factor for the maximum gamma ray detection counts set, measuring the photoelectric factor for the minimum gamma ray detection counts set, and choosing the set with the lower photoelectric factor if the mud weight is greater than a predetermined amount. Computing borehole size using the computed standoffs may comprise adding the diameter of the tool and the two computed standoffs.

In general, in another aspect, the invention features a method for measuring borehole size while drilling. The method includes computing minimum standoff and maximum standoff using formation density and mud density and computing borehole size using minimum standoff and maximum standoff.

In general, in another aspect, the invention features a computer program for computing borehole size using data samples, wherein each data sample corresponds to gamma rays detected during a segment of rotation of a drill string. The computer program executes on a computer processor. The computer program resides on computer readable media. The computer program includes computer code for causing the computer processor to select a high count rate set of samples, select a low count rate set of samples, compute standoff for each set of samples using a formation density, and compute borehole size using the computed standoffs.

DETAILED DESCRIPTION

A borehole size measurement is accomplished by taking multiple density samples per revolution of the drill string and computing standoff, which is the distance from the density tool to the side of the borehole, from the measurements of formation density and mud density.

The following semi-empirical functions can be used to describe the response of the detectors as a function of formation and mud density and stand-off:

For the far detector:

$$\rho_{far}(\rho_b, \rho_m, so) = \rho_m + (\rho_b - \rho_m)e^{-C_f so} \quad (1)$$

in which $\rho_{far}$=Density measured by the far detector $\rho_b$=Formation density $\rho_m$=Mud density so=Standoff, i.e. the distance between the detector and the borehole wall $C_f$=Constant.

For the near detector:

$$\rho_{near}(\rho_b, \rho_m, so) = \rho_c \cdot e^{-C_n(\rho_b - \rho_m) \cdot so} \quad (2)$$

where $\rho_{near}$=Density measured by the near detector $\rho_c = \rho_b$ if so<1 inch $\rho_c = \rho_m + (\rho_b - \rho_m)e^{(1-so)}$ if so>1 inch $C_n$=constant.

Static measurements in aluminum and magnesium blocks with water and mud have provided the data on which these response functions are based. Constant $C_f$ has been determined to be 0.42 and constant $C_n$ to be 0.50. It should be noted that the technique does not require the use of the above response functions: any function (even in, for example, tabular form) that describes the response of the detector can be used.

In conventional density measurement tools, gamma counts are accumulated over a sampling period during which the tool typically makes several rotations in the borehole. Consequently, density data is obtained from the tool for a variety of standoffs during a single accumulation period. For example, referring to FIG. 1, some of the measurements will be made when the standoff is d and others when the standoff is D. In conventional prior art density tools the measurements obtained during an accumulation period are averaged.

In the tool according to one embodiment of the invention, the near and far detector counts are sampled more frequently and for a shorter period of time such that multiple samples are taken per revolution of the drill string and density tool. Consequently, standoff for each "rapid sample" will be much less variable. Generally, to calculate borehole size as described below, between 4 and 15 samples are taken for each revolution of the drill string. Preferably, 10 samples per rotation are taken for 30 rotations (the typical period of sampling for a traditional density tool) to produce a total of 300 rapid samples.

Assuming that the (average) standoff is the only variable for the series of rapid samples obtained during pre-set total sampling period, the formation and mud density can be determined by minimizing the following expression as a function of $\rho_b$ and $\rho_m$:

$$\sum_{i}^{\# \text{ of samples}} \left( \rho_{near}\left(\rho_b, \rho_m, \frac{1}{C_f}\ln\left(\frac{\rho_b - \rho_m}{\rho_{f_i} - \rho_m}\right)\right) - \rho_{n_i} \right)^2 \quad (3)$$

in which $\rho_{n_i}$=Near density of the $i^{th}$ rapid sample $\rho_{f_i}$=Far density of the $i^{th}$ rapid sample The summation is over all rapid samples obtained during a preset total sampling period (preferably 300 samples).

By definition, a "rib" describes the response of the near and far detector to static, i.e. constant, stand-off. Minimizing the above expression is the mathematical formulation of fitting a rib, given by the application of equations (1) and (2), to the rapidly sampled density measurements.

Having determined $\rho_b$ and $\rho_m$ the corresponding standoff can be computed for each rapid sample as:

$$so_i = \frac{1}{C_f}\ln\left(\frac{\rho_b - \rho_m}{\rho_{f_i} - \rho_m}\right) \quad (4)$$

where $so_i$ = Standoff of the $i^{th}$ rapid sample

The borehole diameter can be computed as the sum of the tool diameter, the minimum standoff and the maximum standoff from the resulting array of computed standoffs.

Figure 2:
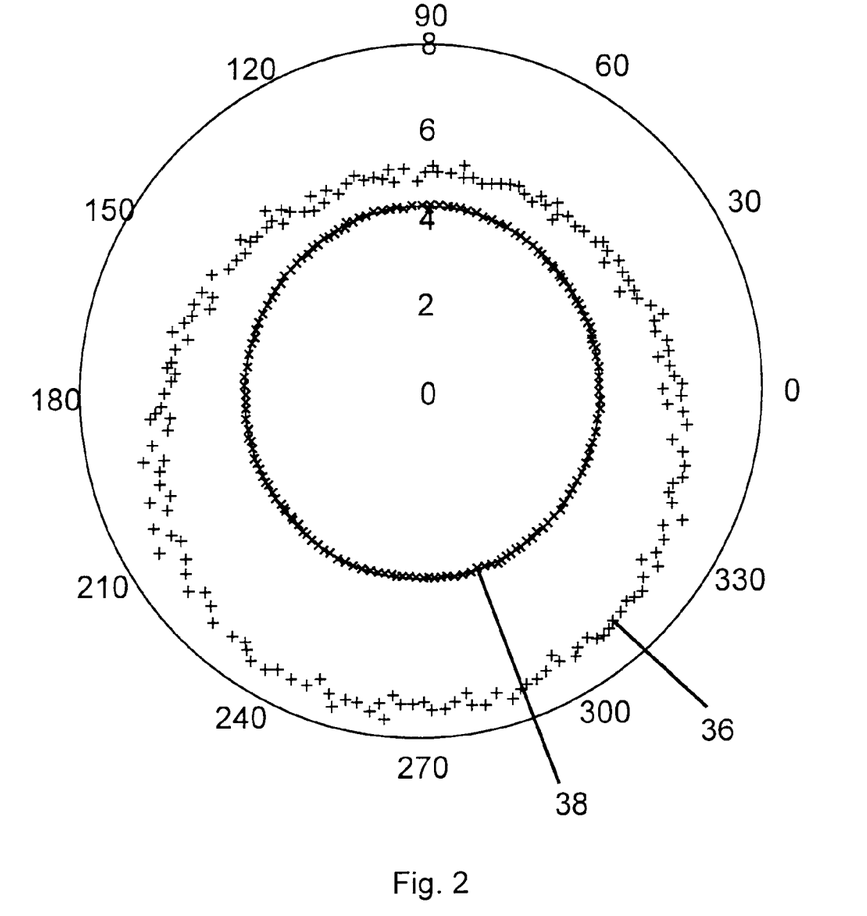
FIG. 2 is a polar plot of borehole size produced according to the present invention.

Assuming a stationary tool axis, an angle can be computed for each rapid sample indicating the relative orientation of the tool as follows:

$$\varepsilon_i = 2\pi \frac{rpm}{60} \cdot \Delta t_{rapid\ sample} \cdot i \quad (5)$$

where $\varepsilon_i$=Relative angle of rotation of the tool while sampling the $i^{th}$ rapid sample rpm=Revolutions per minute $\Delta t_{rapid\ sample}$=Rapid sampling time in seconds If the rotational rate of the tool can be determined with sufficient accuracy, a polar plot of the angle and standoff for all rapid samples, such as that shown in FIG. 2, provides an image of the circumference of the borehole wall. Each "dot" 36 represents a standoff measurement for a single rapid sample. Dots 38 represent the relative bearing at which the rapid sample was taken. The borehole size can be measured from the polar plot shown in FIG. 2.

The rotational rate may be derived by performing a Fast Fourier Transform of the i standoff samples. The caliper measurement (or borehole size), as opposed to borehole shape, does not require any knowledge of the tool's rotational rate.

The performance of the "rib fitting" algorithm will depend on:

1. the variation in standoff while rotating;
2. the number of rapid samples per rotation; and
3. the difference between formation and mud density.

The most computationally-intensive part of the algorithm is minimizing equation (3) as a function of $\rho_b$ and $\rho_m$. However, it may not be necessary to solve for both $\rho_b$ and $\rho_m$. The mud density is likely to be known with sufficient accuracy to be used as input to equation (3). Moreover, in order to compute standoff, minimizing expression (3) is unnecessary if the formation density can be obtained by a different less computationally intensive algorithm like "binning".

MWD measurements of formation density and $P_e$ are significantly affected by tool standoff. By combining the measurements of several detectors, typically one near detector and one far detector, a correction can be made for the effects of small tool standoff up to approximately one inch. Rapid sampling of MWD measurements enables a more accurate measurement if tool standoff is large during any time while rotating in the borehole. While for a conventional measurement an average count rate is obtained over several rotations in the hole, rapid sampling count rates are measured for a sampling period that is short compared to the typical rotational period of any MWD tool. Consequently, for rapid sampling, standoff during each rapid sampling period will be much less variable than for each conventional sampling period. Because of this reduction in variability during sample periods, an accurate measurement of formation properties is possible by basing the measurement on only those rapid samples that were acquired at small standoff.

Processing of rapidly sampled data to find those acquired at small standoff may be done in several ways. If an independent measurement of tool standoff is available, that measurement can be used to decide whether a particular rapid sample should be included in the subsequent computation of formation properties. Such an independent measurement can for example, be made with the acoustic pulse-echo technique. In the absence of an independent measurement of standoff, the count rates measured by the tool itself must be used. In one embodiment of the density tool, counts are measured in several energy "windows" of both the near and the far detector. Each window corresponds to a certain energy range of detected gamma quanta. Even if the tool is stationary, or rotating in a gauge hole, the counts that are measured in each window will vary from (rapid) sample to (rapid) sample. In this case, the statistical variation of the counts follows the Poisson distribution. For a large number of rapid samples, the standard deviation of the measured counts equals the square root of the average number of counts per rapid sample (which is the "expected" standard deviation of the number of counts per rapid sample). The ratio of the standard deviation of the counts and the square root of the average number of counts will therefore be approximately one if the nuclear counting statistics are the only source of count rate variation. The ratio will be larger than one if other causes for variation of the counts are present in addition to the statistical variation, such as, for example, rotation of the tool in an enlarged borehole with varying stand off.

By computing the above-described ratio for a time series of rapidly sampled windowed counts it can be determined whether the observed variation in counts is genuine (i.e. due to variation in standoff) or merely statistical (i.e. due only to statistical variations in gamma ray emissions). Only if the ratio is significantly larger than one (indicating that the variation is genuine) can the rapid samples be subdivided, or distributed into bins in a meaningful manner. The ratio is computed for the time series of counts of more than one energy window. For example, if the mud apparent density is approximately the same as the formation density, the counts in the density window of the far detector will show little more than the statistical variation while rotating in an enlarged hole, while the counts in the $P_e$ window will show large variations as the contrast between formation and mud $P_e$ is likely to be significant. In other words, the effect of standoff on the gamma spectrum measured by the tool will normally not be uniform, and therefore it is important that the entire spectrum or significant portions thereof be considered.

Accordingly, the ratio is computed for the following three energy windows of the far detector:

50–180 keV,
180–400 keV, and
50–400 keV.

If the ratio for none of the time series of these windowed counts is significantly larger than 1 (e.g. 1.2), there is no basis for subdividing, or "binning" of the rapid samples. If the ratio for at least one of the time series is significantly larger than one (e.g. >1.2), the rapid samples can be subdivided into bins in a statistically meaningful manner. The time series with the largest ratio provides the appropriate time series to be used as a basis for the binning of the rapid samples. The binning proceeds on the basis of the rapidly sampled counts of that time series as follows:

Two bins (or "sets") will be constructed: One bin for samples with low count rates and one bin for samples with high count rates. Each bin will include a sufficiently large number of rapid samples to obtain a statistically meaningful subset of samples. This, in turn, implies that a minimum requirement for each bin is that the ratio of actual to "expected" (i.e. "square root") standard deviation of the counts of the rapid samples in the bin is not less than one. Although not essential to the method, a practical way of constructing the bins that lends itself to straightforward implementation in downhole processing software is as follows. For the "low count rate bin", compute a delta count rate as the square root of the average of the minimum and average count rate of all rapid samples using the formula:

$$\Delta_{low\ count\ ratebin} = \sqrt{\frac{counts_{min} + counts_{avg}}{2}} \quad (6)$$

where
$counts_{min}$=Minimum number of counts in the binning time series
$counts_{avg}$=Average number of counts in the binning time series All samples that have a count rate that is less than the minimum plus four delta are included in the "low count rate bin". If the ratio of actual and theoretical standard deviation for this bin is less than preferably 1.2, no statistically meaningly subset of samples has yet been obtained. More samples will be included by raising the maximum count rate of the rapid samples in the bin to the minimum, plus five delta, and so on until the ratio exceeds 1.2. The "high count rate bin" is constructed in an analogous manner with the delta count rate being computed as:

$$\Delta_{high\ count\ ratebin} = \sqrt{\frac{counts_{max} + counts_{avg}}{2}} \quad (7)$$

where
$counts_{max}$=Maximum number of counts in the binning time series

All rapid samples that have a count rate larger than the maximum minus n times the delta count rate will be included in the high count rate bin, where n is determined to be the smallest integer greater than or equal to four for which the ratio described above for the samples in the bin is at least 1.2. Furthermore, in order to assure that statistical "outliers" do not disproportionately affect the outcome of the algorithm, a minimum of 25% or so may be imposed for the number of samples in either bin. By using the same threshold value of 1.2 for the ratio when invoking the binning algorithm and when constructing the bins, convergence of the bin construction algorithm is assured. After construction of the bins, each rapid sample belongs to both bins, or to only one bin, or to neither bin. In other words, the "low count rate bin" and "high count rate bin" may overlap or be well separated as a function of count rate.

Figure 3:
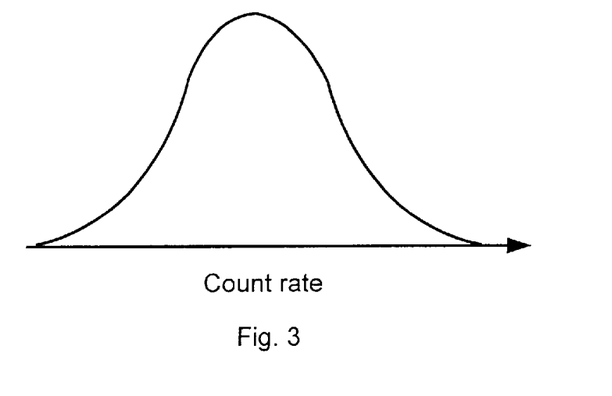
FIGS. 3, 4 and 5 are density plots showing the distribution of samples by count rate according to the present invention.

For example, in FIG. 3, the tool is stationary or rotating in a gauge hole as shown by the Guassian distribution of the counts. The ratio of actual and theoretical standard deviation is less than 1.2 for each of the three time series of windowed counts. Consequently, both bins contain all rapid samples.

Figure 4:
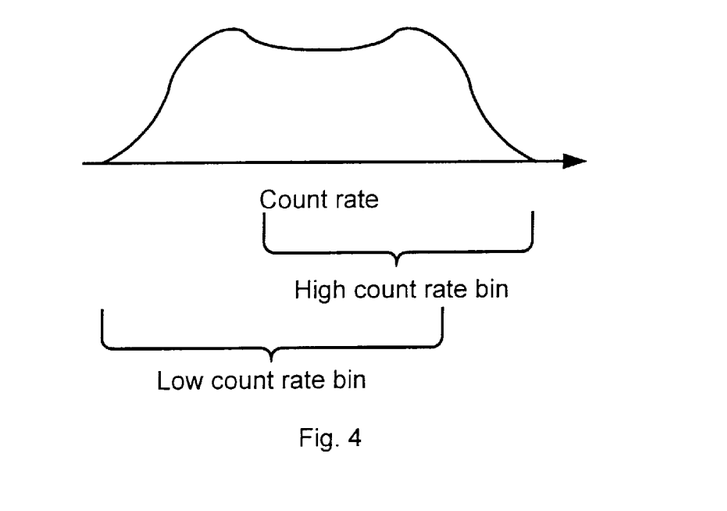

In FIG. 4, the tool is rotating in an enlarged hole. The ratio of actual and theoretical standard deviation is more than 1 (e.g. 2) for the counts in the binning time series. Consequently, there is an overlap between the bins.

Figure 5:
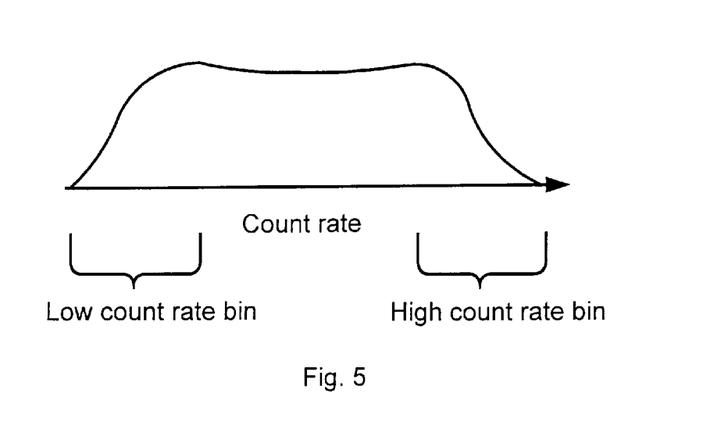

In FIG. 5, the tool is rotating in a large hole. The ratio of actual and theoretical standard deviations is more than 1 (e.g. 4) for the counts in the binning time series. There is no overlap between the bins.

By constructing the bins in this manner, the counts measured by the tool determine whether a sample will be included in the computation of formation density and $P_e$ or not. The orientation of the tool does not matter. In other words, no assumptions need to be made regarding standoff in relation to tool orientation. Consequently, measurement of tool orientation while rotating is not necessary for application of this technique.

After the bins have been constructed, density and $P_e$ values can be computed for both bins. However, it is still necessary to determine which one of the bins corresponds to the smaller standoff. This determination is straightforward if a sufficiently accurate independent measurement of tool standoff is made while rotating in the hole. In case no independent measurement is available, the counts measured by the density tool itself will need to be used for "picking" the formation bin.

In one embodiment, the average standoff is computed for each bin. This method may be inaccurate in case of little density contrast between the mud and the formation.

Another embodiment may be used in such situations. Ordinarily, the borehole mud will have a lower apparent density than the formation. Consequently, the bin with the lower average count rate in the far density window will be the "formation" bin. If, however the mud density is higher than the formation density, it will be the other way around and the bin with the lower far density will be the formation bin. This may occur when drilling with a "heavy" mud. Typically, such a mud will have a high barite content and hence a high $P_e$ value. Experimental data show that under these circumstances the $P_e$ measurement itself provides an excellent means of picking the formation bin. Therefore, a practical and robust way to pick the formation bin is as follows: For relatively low mud weights less than preferably 13 ppg, the bin with the higher far density will be the formation bin. For mud weights over preferably 13 ppg, the bin with the lower $P_e$ will be the formation bin.

An independent measurement of standoff that can be made with, for instance, an acoustic sensor located on or near the density tool may aid or even control each of the processing steps described above. If for each rapid sample a standoff measurement is made, all samples for which the standoff is less than one inch could for instance be included in a bin used to compute formation density. At the very least, an independent measurement can help the process of picking the formation bin or provide a means of quality control by measuring the average standoff of the bins.

If a "binning" algorithm is used, in addition to computing standoff for each rapid sample according to equation (4), the average standoff for each bin may be computed in an analogous way:

$$so_{bin} = \frac{1}{C_f} \ln\left(\frac{\rho_b - \rho_m}{\rho_{f_{bin}} - \rho_m}\right) \tag{8}$$

where $so_{bin}$=Average standoff corresponding to the bin $\rho_{f_{bin}}$=Far density as computed from the average far count rate for all rapid samples contained in the bin.

The hole diameter can be computed as the sum of the tool diameter and the standoff corresponding to the "low count rate" bin and the "high count rate" bin using the formula:

$$\text{Hole diameter} = \text{tool diameter} + so_{low\ count\ rate\ bin} + so_{high\ count\ rate\ bin} \tag{9}$$

where $so_{low\ count\ rate\ bin}$=standoff computed for the low count rate bin $so_{high\ count\ rate\ bin}$=standoff computed for the high count rate bin Because stand-off is computed for averaged ("binned") data rather than for individual rapid samples, statistical variations are smaller. Therefore, if the number of bins is correctly chosen so that a statistically meaningful division of the rapid samples among the bins can be made, the borehole diameter as computed by equation (9) will be more accurate than if computed on the basis of standoff of individual rapid samples using the polar chart, as described above with respect to FIG. 2.

In case of a conventional, i.e. not rapidly sampled density measurement, a hole diameter can be computed in an analogous manner as:

$$\text{Hole diameter} = \text{tool diameter} + \frac{2}{C_f} \ln\left(\frac{\rho_b - \rho_m}{\rho_f - \rho_m}\right) \tag{10}$$

The borehole size algorithm may be executed by a downhole computer or by a computer on the surface. The downhole computer may be in the density tool or in another tool within the drill string. The computer on the surface may receive data from the density tool through mud telemetry or some other communications apparatus while the tool is still in the borehole. Alternatively, the tool may store the data until the tool is pulled out of the borehole when the data is retrieved from the tool and used by the surface computer to perform the borehole calculations.

Figure 6A:
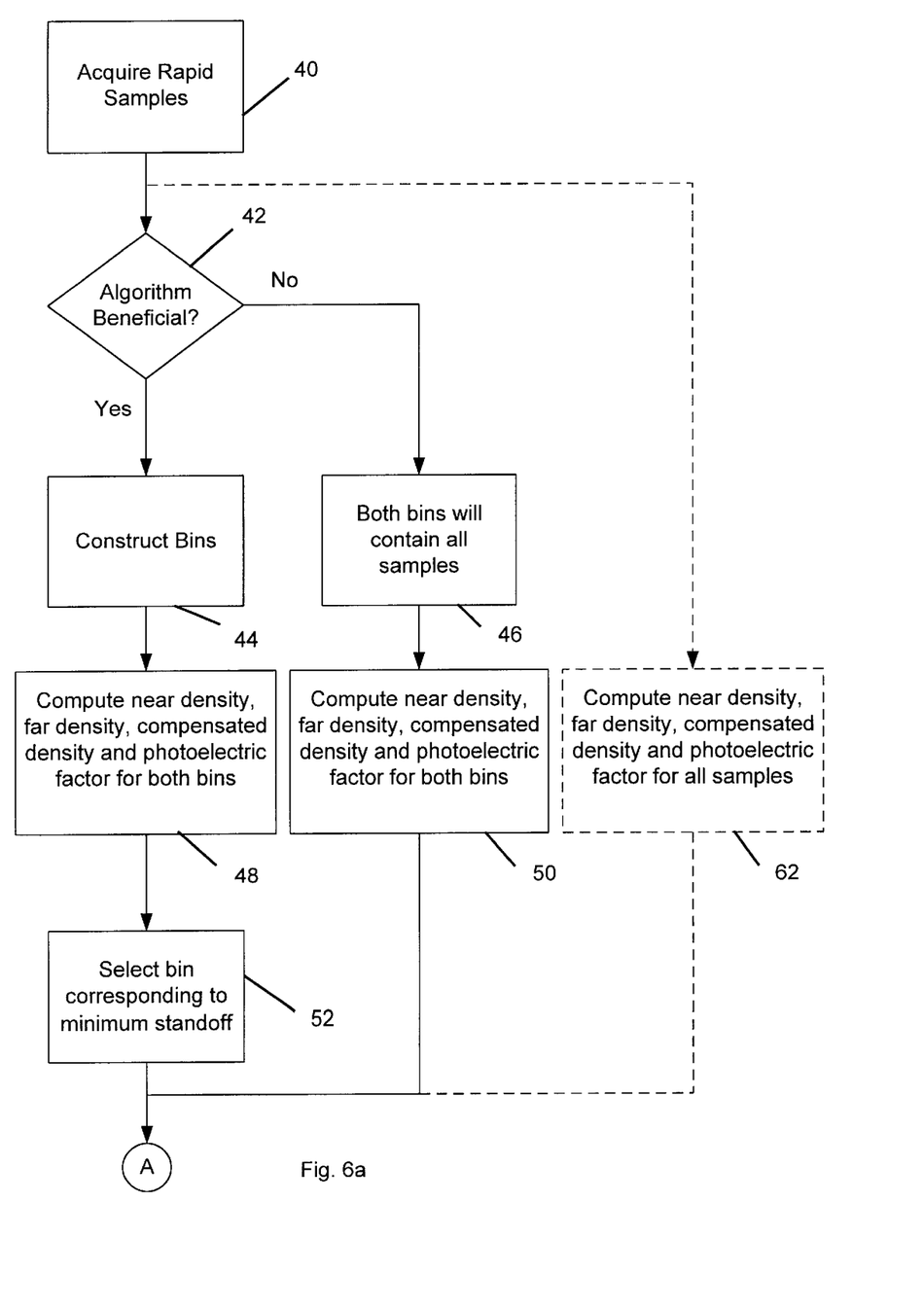
FIGS. 6a, 6b, 7, 8, 9 and 10 are flow charts, which describe several embodiments of the algorithms of the present invention.

In any case, the algorithm begins by acquiring rapid samples (block 40 on FIG. 6a). The algorithm then determines if the "binning" algorithm will be beneficial (block 42) (see discussion of FIG. 7 below for additional details). If so, the bins are constructed (block 44) (see discussion of FIGS. 8 and 9 below for additional details). If the binning algorithm will not be beneficial, both bins will contain all of the samples (block 46). In either case, the algorithm computes near density, far density, compensated density, and photoelectric factor for both bins (blocks 48 and 50). If the algorithm was determined to be beneficial (the "yes" branch out of block 42) and the bins were constructed (block 44) the algorithm selects the bin corresponding to the minimum standoff (block 52) (see discussion of FIG. 10 below for additional details). This is not done if the binning algorithm was determined not to be beneficial (the "no" branch out of block 42).

Figure 6B:
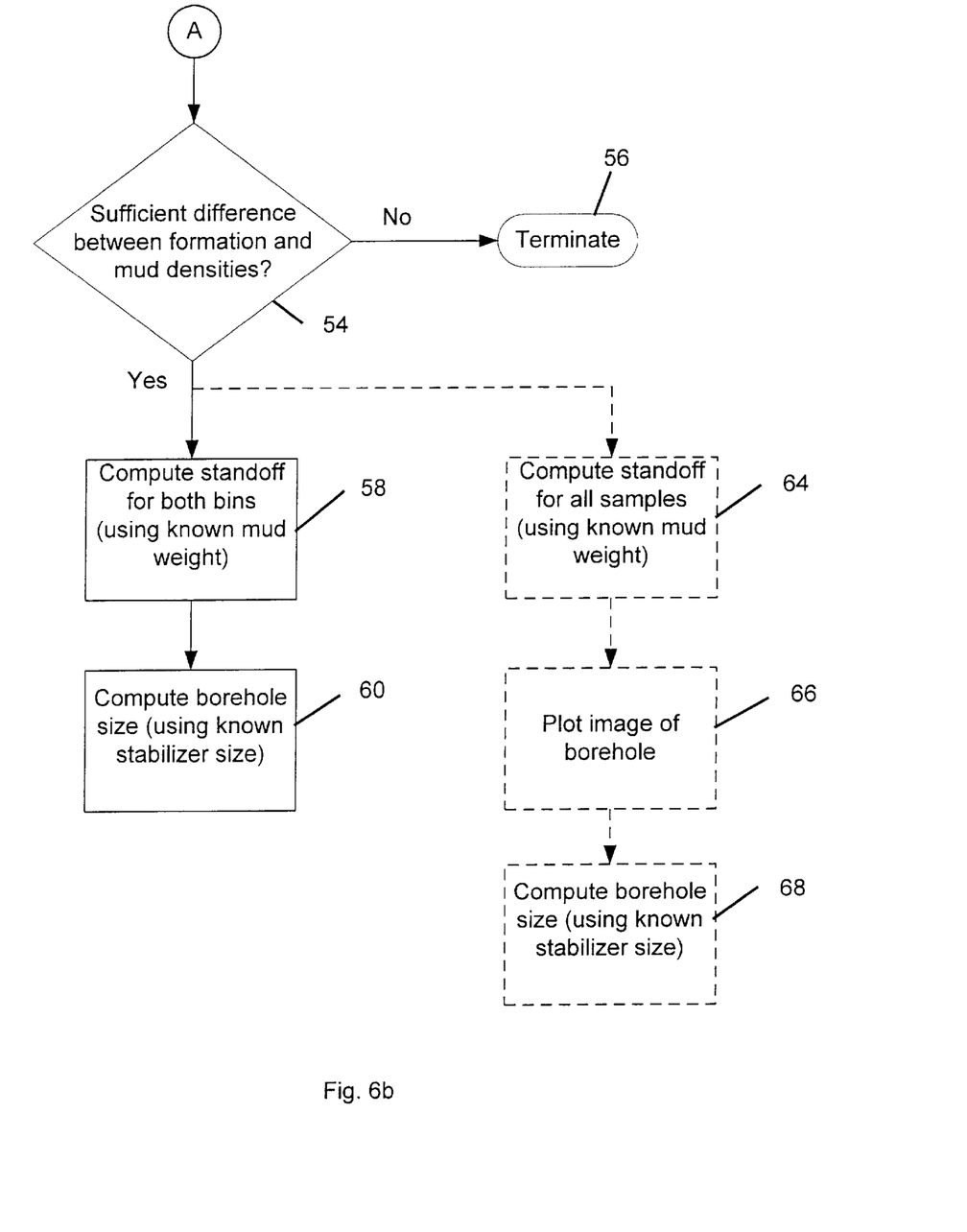

The algorithm next determines if there is sufficient difference between the formation and mud densities (block 54 on FIG. 6b). If there is insufficient difference (the "no" branch out of block 54) the algorithm terminates (block 56). If the difference between formation and mud densities is sufficient (the "yes" branch out of block 54) the algorithm computes standoff for both bins (using equation (8)) (block 58). The borehole size is then computed using the size of the stabilizer and the computed standoff for both bins (using equation (9)) (block 60).

In an alternative embodiment, rather than constructing bins (block 44), the near density, far density, compensated density and photoelectric factor are computed for all of the samples (block 62 on FIG. 6a). Further, rather than computing standoff for the two bins (block 58), standoff is computed for each of the samples (using equation (4)) (block 64 on FIG. 6b). The computed standoffs for each sample are then used to construct an image of the borehole (using equation (5)) (block 66) such as the one illustrated in FIG. 2. The borehole size is also computed using the computed standoffs for each sample and the stabilizer size (block 68).

Figure 7:
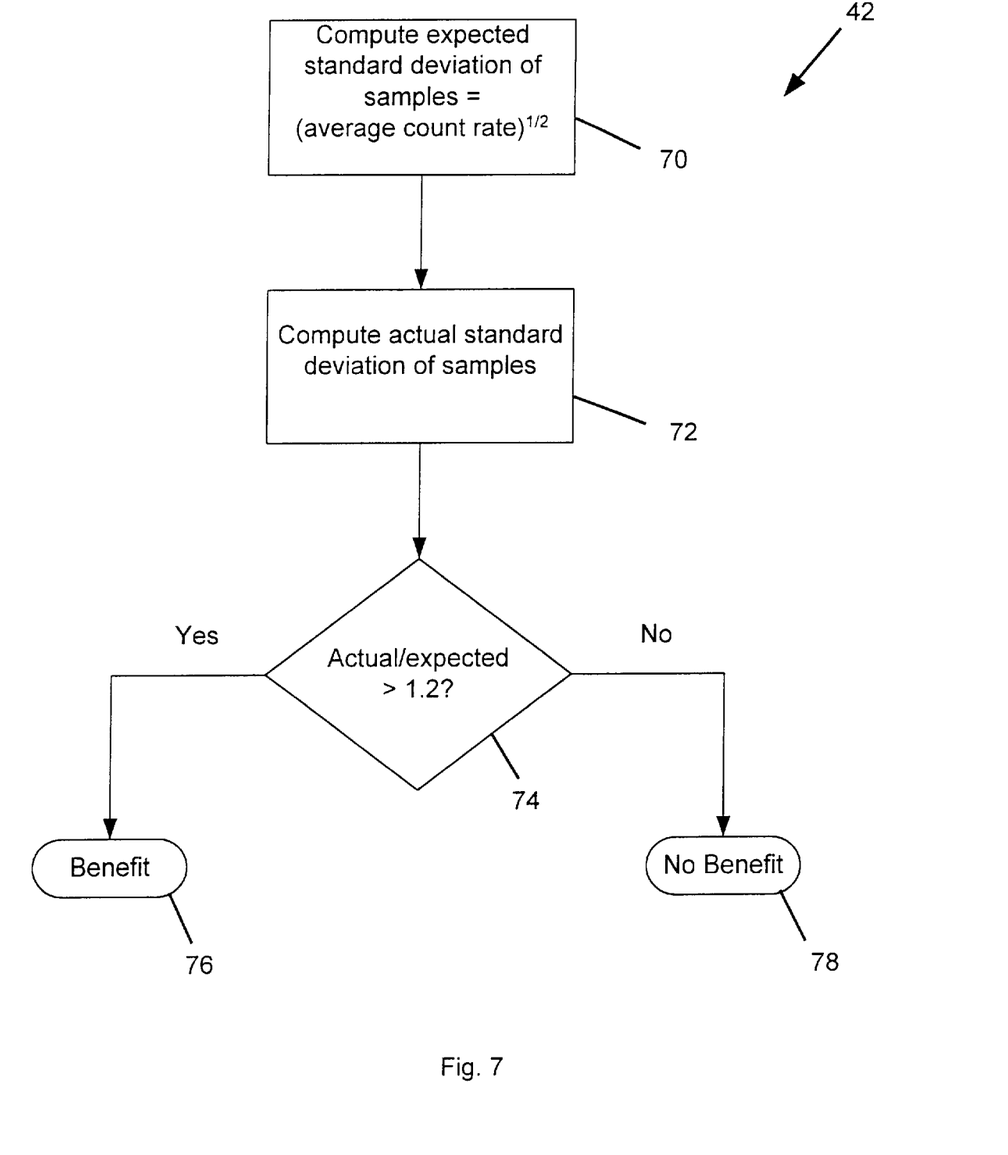

FIG. 7 provides additional details regarding determining if the algorithm is beneficial (block 42). First, the algorithm computes the "expected" standard deviation of the samples (for each of the energy windows as described above) as (block 70):

$$\sqrt{\text{Average count rate of the samples}}$$

The actual standard deviation for the samples is then computed (block 72) (for each of the energy windows). If the ratio of the actual to the expected standard deviation is greater than 1.2 (block 74) for one of the energy windows then there is benefit in binning (block 76). Otherwise, there is no benefit (block 78).

Figure 8:
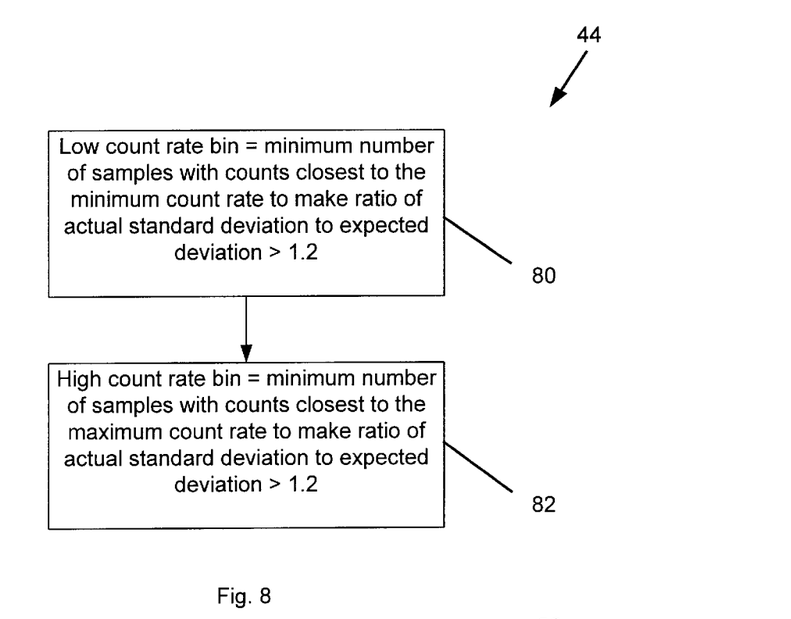

FIG. 8 provides additional details regarding constructing the bins (block 44). The low count rate bin will be constructed to contain the minimum number of samples with counts closest to the minimum count rate to make the ratio of actual standard deviation to expected standard deviation greater than 1.2 for the selected samples (block 80). The high count rate bin will be constructed to contain the minimum number of samples with counts closest to the maximum count rate to make the ratio of actual standard deviation to expected standard deviation greater than 1.2 for the selected samples (block 82). Further, the algorithm discussed with respect to equations (6) and (7) could be used to facilitate this process.

Figure 9:
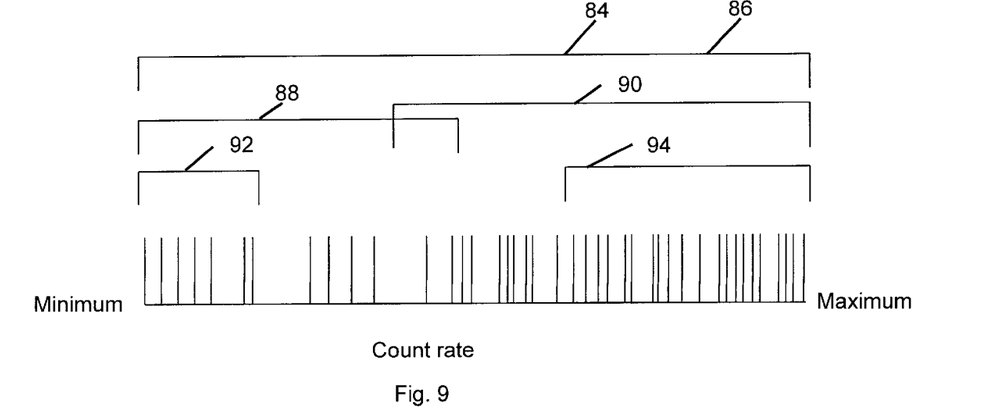

FIG. 9 illustrates the possible results of this process. In one case, both bins 84 and 86 include all of the samples. In another case, the low count rate bin 88 and the high count rate bin 90 overlap. And in yet another case, the low count rate bin 92 is separate from the high count rate bin 94.

Figure 10:
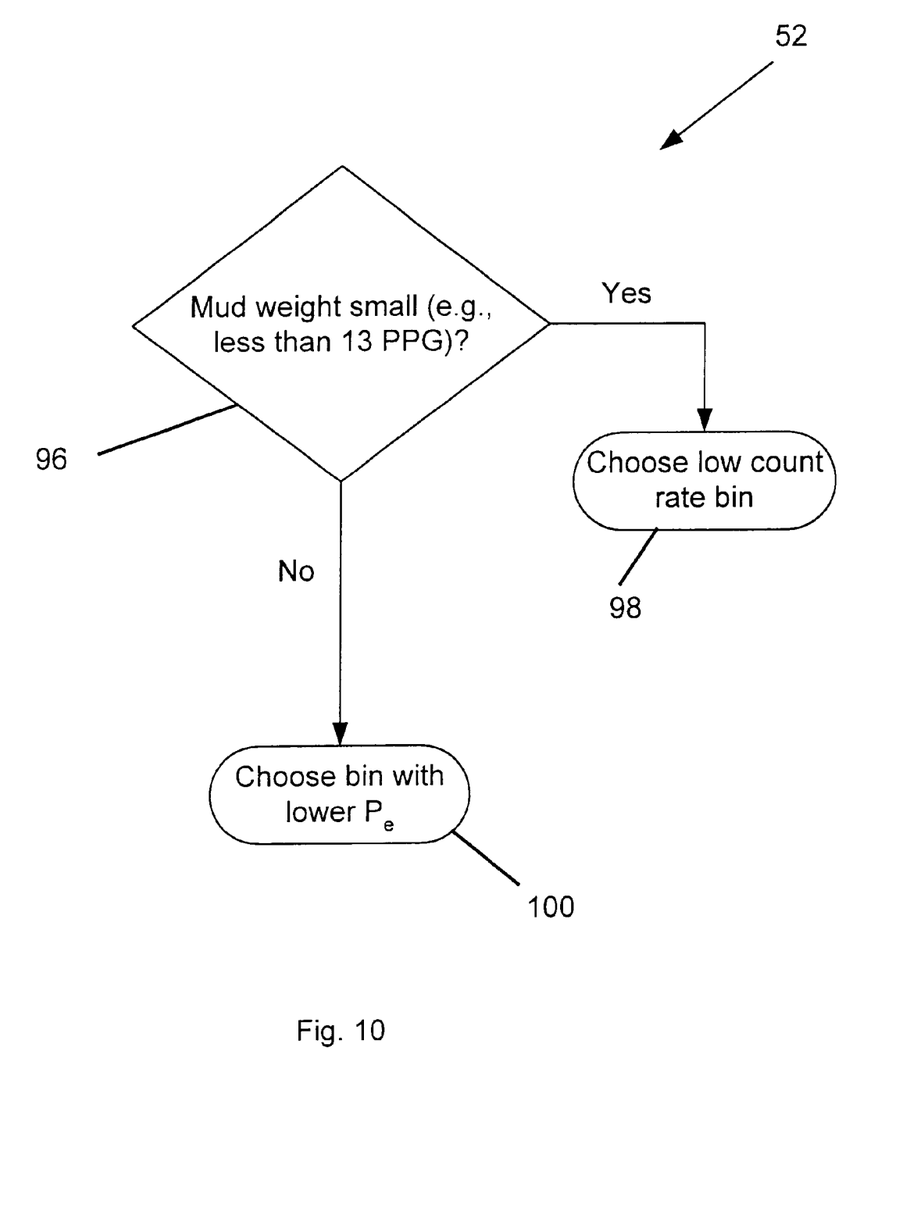

FIG. 10 provides additional detail regarding selecting the bin corresponding to minimum standoff (block 52). If the mud weight is small (e.g. less than 13 ppg) (block 96), the low count rate bin is chosen as the bin corresponding to the minimum standoff (block 98). Otherwise, the bin having the lower $P_e$ is chosen (block 100).

The foregoing describes preferred embodiments of the invention and is given by way of example only. The invention is not limited to any of the specific features described herein, but includes all variations thereof within the scope of the appended claims.

What is claimed is:

1. An apparatus for measuring the size of a borehole while drilling comprising
   a gamma ray source configured to direct gamma rays into a formation;
   a far gamma ray detector configured to detect gamma rays originating in the formation;
   a near gamma ray detector configured to detect gamma rays originating in the formation;
   a far gamma ray counter coupled to the far gamma ray detector;
   a near gamma ray counter coupled to the near gamma ray detector;
     a sampler coupled to the far gamma ray counter and the near gamma ray counter configured to take and store samples from the counters, the sampler configured to reset the counters when a sample is taken;
   a density computer for computing near density and far density for each sample;
   a standoff computer for computing the standoff for each sample from a formation density, a mud density and the far density for that sample; and
   a borehole size computer for adding the maximum standoff, the minimum standoff and the diameter of the apparatus.

2. The apparatus of claim 1 wherein
   $\rho_b$ and $\rho_m$ are computed by minimizing as a function of $\rho_b$ and $\rho_m$:

$$\sum_{i}^{\text{\# of samples}} \left( \rho_{near}\left( \rho_b, \rho_m, \frac{1}{C_f} \ln\left( \frac{\rho_b - \rho_m}{\rho_{f_i} - \rho_m} \right) \right) - \rho_{n_i} \right)^2$$

where
   $\rho_{n_i}$=the near density of the $i^{th}$ sample
   $\rho_{f_i}$=the far density of the $i^{th}$ sample.

3. The apparatus of claim 2 wherein
   $\rho_{near}$ and $\rho_{far}$ are described with the following equations:

$$\rho_{near} = \rho_c \cdot e^{-C_n(\rho_b - \rho_m) \cdot so}$$

where $\rho_c = \rho_b$ if so<1 inch and $\rho_c = \rho_m + (\rho_b - \rho_m)e^{(1-so)}$ if so>1 inch and $C_n$ is a constant $$\rho_{far} = \rho_m + (\rho_b - \rho_m)e^{-C_f so}$$

where $C_f$ is a constant.

4. The apparatus of claim 1 wherein standoff for each sample ($SO_i$) is calculated using the following equation, $$SO_i = \frac{1}{C_f} \ln\left( \frac{\rho_b - \rho_m}{\rho_{f_i} - \rho_m} \right)$$

where $C_f$ is a constant,
   $\rho_b$ is the formation density,
   $\rho_m$ is the density of the mud,
   $\rho_{f_i}$ is the far density computed for that sample.

5. The apparatus of claim 4 wherein $\rho_b$ is computed and $\rho_m$ is known.

6. The apparatus of claim 4 wherein $\rho_b$ and $\rho_m$ are computed.

7. A method for measuring borehole size while drilling comprising
   transmitting gamma rays from a tool coupled to a drill string into a formation surrounding the borehole as the drill string rotates;
   detecting gamma rays from the formation as the drill string rotates using a detector;
   accumulating gamma ray detection counts over each of a plurality of segments of drill string rotation, wherein each segment of drill string rotation comprises less than one full rotation of the drill string and wherein the counts associated with each segment are associated with a sample associated with that segment;
   selecting a set of maximum gamma ray detection counts;
   selecting a set of minimum gamma ray detection counts;
   computing standoff for both sets; and
   computing borehole size using the computed standoffs.

8. The method of claim 7 further comprising
   determining whether borehole size can be computed from the gamma ray detection counts.

9. The method of claim 7, wherein determining whether borehole size can be computed from the gamma ray detection counts comprises
   determining whether sufficient difference exists between formation density and mud density.

10. The method of claim 7 further comprising
determining if separate sets should be constructed.

11. The method of claim 10 wherein determining if separate sets should be constructed comprises
computing an expected standard deviation for a subset of the gamma ray detection counts;
computing an actual standard deviation for the subset of gamma ray detection counts; and
comparing the expected standard deviation to the actual standard deviation.

12. The method of claim 11 wherein comparing comprises
dividing the actual standard deviation by the expected standard deviation and comparing the ratio to a predetermined number.

13. The method of claim 7 wherein selecting a set of maximum gamma ray detection counts comprises
selecting the minimum number of samples with counts closest to the maximum count so that the ratio of a standard deviation of the counts of the selected samples to the expected standard deviation of the counts of the selected samples is greater than a predetermined number.

14. The method of claim 13 further comprising
computing the expected standard deviation of the selected counts by taking the square root of the average of the selected counts.

15. The method of claim 7 wherein selecting a set of minimum gamma ray detection counts comprises
selecting the minimum number of samples with counts closest to the minimum count so that the ratio of a standard deviation of the counts of the selected samples to the expected standard deviation of the counts of the selected samples is greater than a predetermined number.

16. The method of claim 7 wherein computing standoff for both sets using computed formation density comprises
using the following equation to compute standoff $$SO = \frac{1}{C_f} \ln\left(\frac{\rho_b - \rho_m}{\rho_f - \rho_m}\right)$$

where $C_f$ is a constant, $\rho_b$ is the formation density, $\rho_m$ is the density of the mud, and $\rho_f$ is the far density computed from the average count for all far gamma ray counts in the set.

17. The method of claim 16 wherein $\rho_b$ is computed and $\rho_m$ is known.

18. The method of claim 7 further comprising
selecting one of the sets as the set corresponding to minimum standoff.

19. The method of claim 18 wherein selecting one of the sets as the set corresponding to minimum standoff comprises:
selecting the set with the higher far density if mud weight is less than a predetermined amount.

20. The method of claim 18 wherein selecting one of the sets as the set corresponding to minimum standoff further comprises:
measuring the photoelectric factor for the maximum gamma ray detection counts set;
measuring the photoelectric factor for the minimum gamma ray detection counts set;
choosing the set with the lower photoelectric factor if the mud weight is greater than a predetermined amount.

21. The method of claim 7 wherein computing borehole size using the computed standoffs comprises
adding the diameter of the tool and the two computed standoffs.

22. A method for measuring borehole size while drilling, the method comprising
computing minimum standoff and maximum standoff using formation density and mud density; and
computing borehole size using minimum standoff and maximum standoff.

23. A computer program for computing borehole size using data samples, wherein each data sample corresponds to gamma rays detected during a segment of rotation of a drill string, the computer program executing on a computer processor, the computer program residing on computer readable media, the computer program comprising computer code for causing the computer processor to:
select a high count rate set of samples;
select a low count rate set of samples;
compute standoff for each set of samples using a formation density; and
compute borehole size using the computed standoffs.

* * * * *